(12) United States Patent
Hotta

(10) Patent No.: US 12,354,589 B2
(45) Date of Patent: Jul. 8, 2025

(54) MOVEMENT SOUND GENERATION SYSTEM

(71) Applicant: DENTSU INC., Tokyo (JP)

(72) Inventor: Mihoko Hotta, Tokyo (JP)

(73) Assignee: DENTSU INC., Tokyo (JP)

( * ) Notice: Subject to any disclaimer, the term of this patent is extended or adjusted under 35 U.S.C. 154(b) by 254 days.

(21) Appl. No.: 18/248,018

(22) PCT Filed: Aug. 20, 2021

(86) PCT No.: PCT/JP2021/030497
§ 371 (c)(1),
(2) Date: Apr. 5, 2023

(87) PCT Pub. No.: WO2022/074943
PCT Pub. Date: Apr. 14, 2022

(65) Prior Publication Data
US 2023/0377555 A1    Nov. 23, 2023

(30) Foreign Application Priority Data
Oct. 6, 2020    (JP) .................................. 2020-168890

(51) Int. Cl.
G10K 15/02    (2006.01)
G10K 15/12    (2006.01)

(52) U.S. Cl.
CPC ............ *G10K 15/02* (2013.01); *G10K 15/12* (2013.01)

(58) Field of Classification Search
CPC .............................. G10K 15/02; G10K 15/12
(Continued)

(56) References Cited

U.S. PATENT DOCUMENTS

2010/0022305 A1* 1/2010 Yano ............... A63F 13/54
463/36
2020/0230494 A1    7/2020 Gotoh et al.

FOREIGN PATENT DOCUMENTS

CN    107277736 A    10/2017
JP    2002-536680 A    10/2002
(Continued)

OTHER PUBLICATIONS

International Search Report issued in PCT/JP2021/030497; mailed Nov. 2, 2021.
(Continued)

*Primary Examiner* — Vivian C Chin
*Assistant Examiner* — Douglas J Suthers
(74) *Attorney, Agent, or Firm* — Studebaker Brackett PLLC

(57) ABSTRACT

A movement sound generation system (1) generates a movement sound when a moving body moves on a predetermined movement surface in a virtual space. A sound volume of the movement sound is decided based on a mass of the moving body in the virtual space. A sound quality of the movement sound is decided based on material information of a ground contacting portion of the moving body which contacts a movement surface in the virtual space, and on material information of the movement surface contacted by the ground contacting portion of the moving body. A sound production timing of the movement sound is decided based on a timing at which the ground contacting portion of the moving body contacts the movement surface. The movement sound of the moving body is played in the virtual space, with a sound volume, with a sound quality, and at a sound production timing.

6 Claims, 4 Drawing Sheets

(58) Field of Classification Search
USPC .......................................................... 381/61
See application file for complete search history.

(56) References Cited

FOREIGN PATENT DOCUMENTS

| | | |
|---|---|---|
| JP | 2005-218706 A | 8/2005 |
| JP | 2008-200255 A | 9/2008 |
| JP | 2010-022646 A | 2/2010 |
| JP | 2018-201790 A | 12/2018 |
| WO | 2000/045387 A1 | 8/2000 |
| WO | 2018/186178 A1 | 10/2018 |

OTHER PUBLICATIONS

"Notice of Reasons for Refusal" Office Action issued in JP 2020-168890; mailed by the Japanese Patent Office on Nov. 2, 2021.
"Notice of Reasons for Refusal" Office Action issued in JP 2020-168890; mailed by the Japanese Patent Office on Mar. 22, 2022.
"Notice of Termination of Reconsideration by Examiners before Appeal Proceedings" Office Action issued in JP 2020-168890; mailed by the Japanese Patent Office on Jun. 21, 2022.
"Notice of Reasons for Refusal" Office Action issued in JP 2020-168890; mailed by the Japanese Patent Office on Dec. 20, 2022.
An Office Action mailed by China National Intellectual Property Administration on May 19, 2025, which corresponds to Chinese Patent Application No. 202180064084.3 and is related to U.S. Appl. No. 18/248,018; with English language translation.

* cited by examiner

FIG. 2
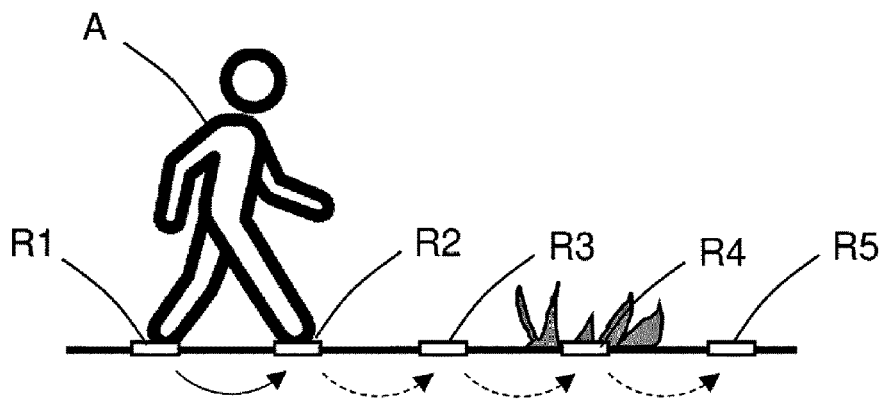
FIG. 3
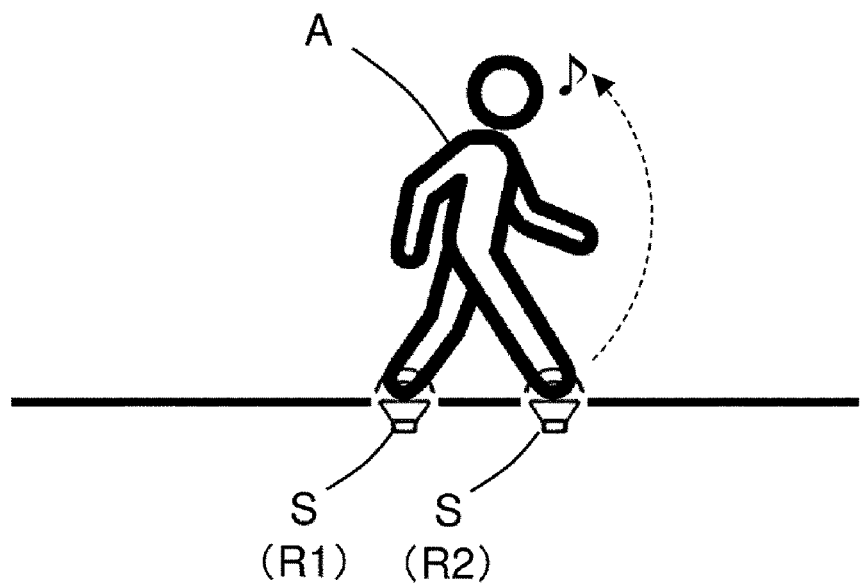
FIG. 4

MOVEMENT SOUND GENERATION SYSTEM

TECHNICAL FIELD

The present invention relates to a movement sound generation system which generates a movement sound in a case where a moving body moves in a virtual space.

BACKGROUND ART

In related art, a system has been suggested which generates a movement sound in a case where a moving body moves in a virtual space. For example, a method has been suggested in which in order to express movement of a moving object (such as a non-player character, a non-commercial product, or a vehicle) in a virtual space, a sound source is moved at a predetermined speed in a certain direction (for example, see Patent Literature 1).

However, in the method of the related art, although movement sounds of moving objects around a moving body (character) which is operated by a user are played and reality can be obtained to some extent, because movement sounds which are produced by the moving body (character) itself operated by the user and other moving bodies are not played, bodily sensation in the user in the virtual space has been low. For example, in a real space, a person hears sound volumes, sound qualities, and rhythms of movement sounds of the person himself/herself when he/she is moving, thereby analogizes distinctions among situations about what kinds of ground surface environment are given and how fast he/she is moving, and recognizes those situations. Further, as for approach and passage of other persons and cars also, a person locates and analogizes sound images of sound sources from movement sounds without resort to visual perception.

CITATION LIST

Patent Literature

Patent Literature 1: Japanese Patent Laid-Open No. 2018-201790

SUMMARY OF INVENTION

Technical Problem

The present invention has been made based on the above background. An object of the present invention is to provide a movement sound generation system which can generate a movement sound with reality such that analogy and recognition in a real space can also be recreated in a virtual space and can improve bodily sensation in a user in the virtual space.

Solution to Problem

One aspect of the present invention provides a movement sound generation system, and the movement sound generation system is a movement sound generation system generating a movement sound in a case where a moving body moves on a predetermined movement surface in a virtual space, the movement sound generation system including: a sound volume decision unit which decides a sound volume of the movement sound based on a mass of the moving body in the virtual space; a sound quality decision unit that decides a sound quality of the movement sound based on material information of a ground contacting portion of the moving body which contacts a movement surface in the virtual space, and on material information of the movement surface contacted by the ground contacting portion of the moving body; a sound production timing decision unit which decides a sound production timing of the movement sound based on a timing at which the ground contacting portion of the moving body contacts the movement surface; and a movement sound playing unit which plays the movement sound of the moving body with a sound volume decided by the sound volume decision unit, with a sound quality decided by the sound quality decision unit, and at a sound production timing decided by the sound production timing decision unit in the virtual space.

Another aspect of the present invention provides a method of generating a movement sound in a case where a moving body moves on a predetermined movement surface in a virtual space, the method being executed in a movement sound generation system, the method including: a step of deciding a sound volume of the movement sound based on a mass of the moving body in the virtual space; a step of deciding a sound quality of the movement sound based on material information of a ground contacting portion of the moving body which contacts a movement surface in the virtual space, and on material information of the movement surface contacted by the ground contacting portion of the moving body; a step of deciding a sound production timing of the movement sound based on a timing at which the ground contacting portion of the moving body contacts the movement surface; and a step of playing the movement sound of the moving body with a sound volume, with a sound quality, and at a sound production timing, which are decided in the steps, in the virtual space.

Another aspect of the present invention provides a program for generating a movement sound in a case where a moving body moves on a predetermined movement surface in a virtual space, the program causing a computer to execute: a process of deciding a sound volume of the movement sound based on a mass of the moving body in the virtual space; a process of deciding a sound quality of the movement sound based on material information of a ground contacting portion of the moving body which contacts a movement surface in the virtual space, and on material information of the movement surface contacted by the ground contacting portion of the moving body; a process of deciding a sound production timing of the movement sound based on a timing at which the ground contacting portion of the moving body contacts the movement surface; and a process of playing the movement sound of the moving body with a sound volume, with a sound quality, and at a sound production timing, which are decided in the processes, in the virtual space.

As described in the following, other aspects are present in the present invention. Consequently, this disclosure of the invention is intended to provide a part of aspects of the present invention and is not intended to restrict the scope of the invention which is described and claimed herein.

BRIEF DESCRIPTION OF DRAWINGS

FIG. 2 is an explanatory diagram illustrating an example of sound quality decision of a movement sound.

FIG. 3 is an explanatory diagram illustrating an example of prediction about contacting portions of a movement surface.

FIG. 4 is an explanatory diagram illustrating an example of installation of virtual speakers.

DESCRIPTION OF EMBODIMENT

Figure 1:
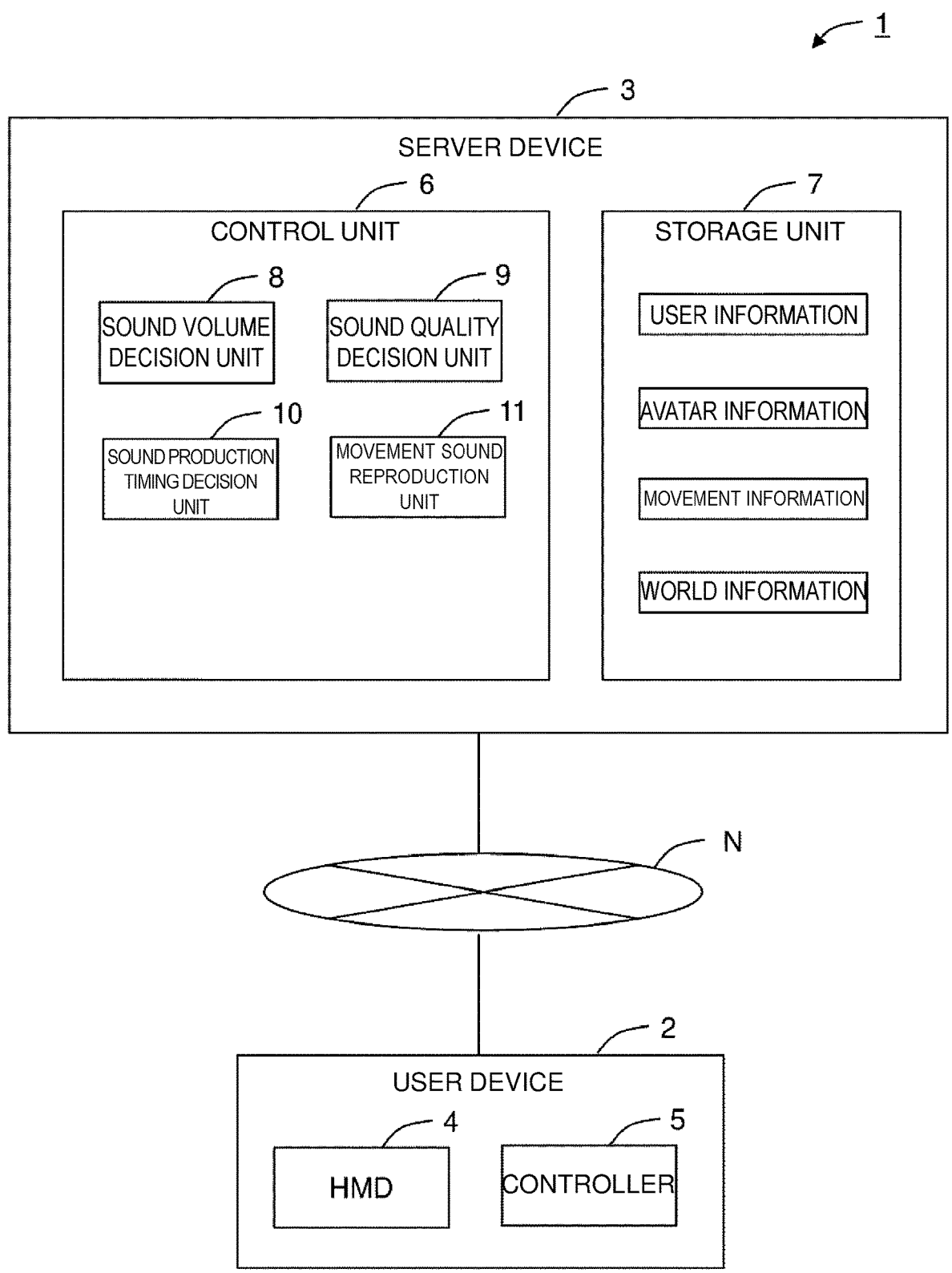
FIG. 1 is a block diagram illustrating a configuration of a movement sound generation system in an embodiment of the present invention.

The present invention will hereinafter be described in detail. However, the following detailed descriptions and the attached drawings do not limit the invention.

A movement sound generation system of the present invention is a movement sound generation system generating a movement sound in a case where a moving body moves on a predetermined movement surface in a virtual space, the movement sound generation system including: a sound volume decision unit which decides a sound volume of the movement sound based on a mass of the moving body in the virtual space; a sound quality decision unit that decides a sound quality of the movement sound based on material information of a ground contacting portion of the moving body which contacts a movement surface in the virtual space, and on material information of the movement surface contacted by the ground contacting portion of the moving body; a sound production timing decision unit which decides a sound production timing of the movement sound based on a timing at which the ground contacting portion of the moving body contacts the movement surface; and a movement sound playing unit which plays the movement sound of the moving body with a sound volume decided by the movement sound decision unit, with a sound quality decided by the sound quality decision unit, and at a sound production timing decided by the sound production timing decision unit in the virtual space.

In this configuration, the movement sound in a case where the moving body (such as an avatar, for example) moves on the predetermined movement surface (such as a ground surface or a floor surface, for example) in the virtual space (such as a VR space, for example) is automatically generated. In this case, the sound volume of the movement sound is decided based on the mass of the moving body, the sound quality of the movement sound is decided based on the material information of the ground contacting portion of the moving body and of the movement surface, and the sound production timing of the movement sound is decided based on the timing at which the ground contacting portion of the moving body contacts the movement surface.

Consequently, the movement sounds with reality can be generated for individual moving bodies (including a moving body operated by a user) in the virtual space, and bodily sensation in the user in the virtual space is thereby improved.

That is, in this configuration, the movement sound with reality can be generated such that analogy and recognition in a real space can also be recreated in the virtual space. In this case, the movement sound which is produced by the moving body itself is generated, and reality can be improved. Further, movement sounds of all of moving bodies are produced, and sound images of sound sources of the other moving bodies can thereby be located and analogized.

Further, in the movement sound generation system of the present invention, based on movement information of the moving body, the sound quality decision unit may predict a contacting portion of the movement surface to be contacted by the ground contacting portion of the moving body, and may read in advance only material information of the predicted contacting portion of the movement surface.

In this configuration, when the sound quality of the movement sound is decided, the contacting portion of the movement surface to be contacted by the ground contacting portion of the moving body is predicted, and only the material information of the contacting portion of the movement surface is read in advance.

Consequently, compared to a case where the material information of the whole movement surface is read, a processing load for generating the movement sound can be reduced.

Further, in the movement sound generation system of the present invention, the movement sound playing unit may install a virtual speaker, which plays the movement sound of the moving body, in a contacting portion of the movement surface contacted by the ground contacting portion of the moving body.

In this configuration, the virtual speaker which plays the movement sound of the moving body is installed in the contacting portion of the movement surface contacted by the ground contacting portion of the moving body. The movement sound of the moving body is played from the virtual speaker which is installed as described above, and the movement sound with reality can thereby be generated.

Further, in the movement sound generation system of the present invention, in a case where the mass of the moving body in the virtual space is not set, the sound volume decision unit may estimate the mass of the moving body based on a volume of the moving body.

In this configuration, even in a case where the mass of the moving body in the virtual space is not set, the mass of the moving body is estimated based on the volume of the moving body, and the sound volume of the movement sound can thereby appropriately be decided.

Further, in the movement sound generation system of the present invention, the sound production timing decision unit may make a determination about the timing at which the ground contacting portion of the moving body contacts the movement surface based on a timing at which potential energy of the ground contacting portion of the moving body becomes a minimum.

In this configuration, a determination can appropriately be made about the timing at which the ground contacting portion of the moving body contacts the movement surface based on the timing at which the potential energy of the ground contacting portion of the moving body becomes the minimum, and the sound production timing of the movement sound can thus appropriately be decided.

A method of the present invention is a method of generating a movement sound in a case where a moving body moves on a predetermined movement surface in a virtual space, the method being executed in a movement sound generation system, the method including: a step of deciding a sound volume of the movement sound based on a mass of the moving body in the virtual space; a step of deciding a sound quality of the movement sound based on material information of a ground contacting portion of the moving body which contacts a movement surface in the virtual space, and on material information of the movement surface contacted by the ground contacting portion of the moving body; a step of deciding a sound production timing of the movement sound based on a timing at which the ground contacting portion of the moving body contacts the movement surface; and a step of playing the movement sound of the moving body with a sound volume, with a sound quality, and at a sound production timing, which are decided in the steps, in the virtual space.

By this method also, similarly to the above system, the movement sounds with reality can be generated for the individual moving bodies (including the moving body operated by the user) in the virtual space, and bodily sensation in the user in the virtual space is thereby improved.

A program of the present invention is a program for generating a movement sound in a case where a moving body moves on a predetermined movement surface in a virtual space, the program causing a computer to execute: a process of deciding a sound volume of the movement sound based on a mass of the moving body in the virtual space; a process of deciding a sound quality of the movement sound based on material information of a ground contacting portion of the moving body which contacts a movement surface in the virtual space, and on material information of the movement surface contacted by the ground contacting portion of the moving body; a process of deciding a sound production timing of the movement sound based on a timing at which the ground contacting portion of the moving body contacts the movement surface; and a process of playing the movement sound of the moving body with a sound volume, with a sound quality, and at a sound production timing, which are decided in the processes, in the virtual space.

By this program also, similarly to the above system, the movement sounds with reality can be generated for the individual moving bodies (including the moving body operated by the user) in the virtual space, and bodily sensation in the user in the virtual space is thereby improved.

In the present invention, the movement sound with reality can be generated, and bodily sensation in the user in the virtual space can be improved.

EMBODIMENT

A movement sound generation system of an embodiment of the present invention will hereinafter be described with reference to the drawings. In the present embodiment, a case of a system will be raised as an example, the system generating a movement sound in a case where a moving body (such as an avatar) moves on a predetermined movement surface (such as a ground surface or a floor surface) in a virtual reality space.

A configuration of the movement sound generation system of the present embodiment will be described with reference to the drawings. FIG. 1 is a block diagram illustrating a configuration of the movement sound generation system of the present embodiment. As illustrated in FIG. 1, a movement sound generation system 1 is configured with a user device 2 and a server device 3 which are connected with each other by a network N.

The user device 2 is a device which is operated by a user and includes a head mounted display 4 (HMD) and a controller 5, for example. Note that the user device 2 is not limited to a device which includes the head mounted display 4. The user device 2 may include a personal computer, a smartphone, a tablet terminal, or the like, for example.

The head mounted display 4 is a display device of a type which is mounted on the head of the user and covers visual fields of both eyes of the user. The user on whom the head mounted display is mounted can view a picture which is displayed on the head mounted display 4. A display form of the head mounted display 4 is not particularly restricted and may be a form in which an object is displayed in an arbitrary position in a virtual space (virtual reality space) with a depth or may be a form in which an object is displayed in an arbitrary position in a virtual plane.

The controller 5 is an input interface which accepts an operation input from the user. Although not illustrated here, for example, the controller 5 has at least one operation button and various sensors which are built therein and detect directions and motions (such as acceleration and rotation) of the controller 5. By the operation input from the controller 5, the user can move the avatar in the virtual reality space. Further, by other than the operation by the controller, the avatar may be moved while being synchronized with movement of the user himself/herself in an actual environment.

The server device 3 includes a control unit 6 and a storage unit 7. For example, the control unit 6 is configured with a processor or the like, and the storage unit 7 is configured with a large capacity memory or the like.

The control unit 6 includes a sound volume decision unit 8, a sound quality decision unit 9, a sound production timing decision unit 10, and a movement sound playing unit 11. The storage unit 7 stores user information (such as user account information, for example), avatar information (such as a kind, a size, a mass of the avatar and a material of a ground contacting portion, for example), movement information (such as a position (coordinates), a movement direction, a movement speed, and a movement posture (such as bipedal walking, bipedal running, quadrupedal walking, quadrupedal running, and wheel running) of the avatar, for example), world information (such as gravitational acceleration and a material of the movement surface, for example).

Kinds of avatars include a human type, an animal type, an insect type, a plant type, a food type, an imaginary creature type (such as a dragon, a Pegasus, or a yeti), a robot type, an object type having wheels (such as a car character), and so forth, for example.

Materials of ground contacting portions of the avatars include a bare foot, a fabric (a fabric of a sock, a fabric of a Japanese sock (tabi), or a fabric of a slipper), rubber (such as rubber of a shoe, a rubber of a running shoe, rubber of a rubber boot, or rubber of a tire), a plant such as wood or grass (such as wood of a wooden clog (geta) or straw of a straw sandal), leather (such as leather of a leather shoe or leather of a slipper), metal (such as metal of a wheel), and so forth, for example.

Materials of movement surfaces include asphalt, concrete, tile, stone pavement, a puddle, earth, sand, gravel, a rock, a swamp, a grass field, a tree, grass, moss, frost, snow, hail, a fallen leaf, and so forth, for example in a case of an outdoor environment and include flooring, a carpet, a tile carpet, a tatami mat, cork, a runner, a rug, a mat, and so forth, for example in a case of an indoor environment.

The sound volume decision unit 8 decides a sound volume of the movement sound based on the mass of the moving body (avatar) in the virtual space. For example, the sound volume can be decided such that the sound volume becomes larger as the mass becomes larger. Further, the sound volume decision unit 8 may decide the sound volume of the movement sound based on the weight (=mass×gravitational acceleration) of the moving body (avatar) in the virtual space. For example, the sound volume can be decided such that the sound volume becomes larger as the weight becomes larger. In addition, the sound volume decision unit 8 may decide the sound volume of the movement sound based on a swung-up position (z coordinate) of a ground contacting portion of the moving body (a foot of the avatar). For example, the sound volume can be decided such that the sound volume becomes larger as the swung-up position becomes higher.

Further, in a case where the mass of the moving body in the virtual space is not set, the sound volume decision unit 8 may estimate the mass of the moving body based on the volume of the moving body. For example, it is estimated that the mass of the moving body becomes larger as the volume of the moving body becomes larger, and the sound volume can thereby be decided such that the sound volume becomes larger as the volume becomes larger.

The sound quality decision unit 9 decides a sound quality of the movement sound based on material information of the ground contacting portion of the moving body (the foot of the avatar) which contacts the movement surface in the virtual space and on material information of the movement surface (the ground surface or the floor surface) contacted by the ground contacting portion of the moving body.

FIG. 2 is an explanatory diagram illustrating an example of sound quality decision of the movement sound. As illustrated in FIG. 2, for example, in a case where the material of the ground contacting portion of the moving body (the foot of the avatar) is "bare foot" and the material of the movement surface (ground surface) is "asphalt", the sound quality of the movement sound is decided as "sound quality a". Data of sound qualities (sound qualities a, b, . . . ) of movement sounds may be prepared in advance as a library. Alternatively, based on the material information of the ground contacting portion of the moving body (the foot of the avatar) and the material information of the movement surface (the ground surface or the floor surface) contacted by the ground contacting portion of the moving body, the sound quality of the movement sound may be calculated at each time.

Further, based on the movement information of the moving body, the sound quality decision unit 9 may predict a contacting portion of the movement surface to be contacted by the ground contacting portion of the moving body and may read in advance only the material information of the predicted contacting portion of the movement surface.

FIG. 3 is an explanatory diagram illustrating an example of the sound quality decision of the movement sound. FIG. 3 illustrates, as R1, the contacting portion of the movement surface with which the left foot of a moving body (avatar A) is contacting and illustrates, as R2, the contacting portion of the movement surface with which the right foot is contacting. In this case, based on the movement information (such as the position, the movement direction, the movement speed, and the movement posture of the avatar) of the moving body (avatar A), contacting portions R3, R4, and R5 of the movement surface with which the ground contacting portions of the moving body contact can be predicted. Then, only the material information of the predicted contacting portions R3, R4, and R5 is read in advance.

The sound production timing decision unit 10 decides a sound production timing of the movement sound based on a timing at which the ground contacting portion of the moving body contacts the movement surface. For example, the sound production timing decision unit 10 may determine whether or not the ground contacting portion of the moving body contacts the movement surface and may thereby decide the sound production timing of the movement sound based on a determination result.

Further, the sound production timing decision unit 10 may make a determination about the timing at which the ground contacting portion of the moving body contacts the movement surface based on a timing at which the potential energy of the ground contacting portion of the moving body becomes a minimum. In this case, the potential energy of the ground contacting portion of the moving body can be calculated based on the following formula.

$$\text{Potential energy} = \text{mass of avatar} \times \text{gravitational acceleration} \times \text{height of ground contacting portion of moving body}$$

Here, the height of the ground contacting portion of the moving body represents the z coordinate of the lowest point or the center of gravity of the ground contacting portion of the moving body (each of the left and right feet, for example).

Note that in a case where the mass of the avatar and the gravitational acceleration are fixed, the sound production timing decision unit 10 may make a determination about the timing at which the ground contacting portion of the moving body contacts the movement surface based on the timing at which the height of the ground contacting portion of the moving body becomes a minimum.

The movement sound playing unit 11 plays the movement sound of the moving body with the sound volume decided by a sound volume decision unit, with the sound quality decided by the sound quality decision unit 9, and at the sound production timing decided by the sound production timing decision unit 10 in the virtual space. For example, virtual speakers which reproduce the movement sounds of the moving body are installed in the contacting portions of the movement surface with which the ground contacting portions of the moving body contact, and the movement sounds of the moving body can thereby be played.

FIG. 4 is an explanatory diagram illustrating an example of installation of the virtual speakers. In the example in FIG. 4, virtual speakers S are respectively installed in the contacting portion R1 of the movement surface with which the left foot of the moving body (avatar A) is contacting and in the contacting portion R2 of the movement surface with which the right foot is contacting.

Figure 5:
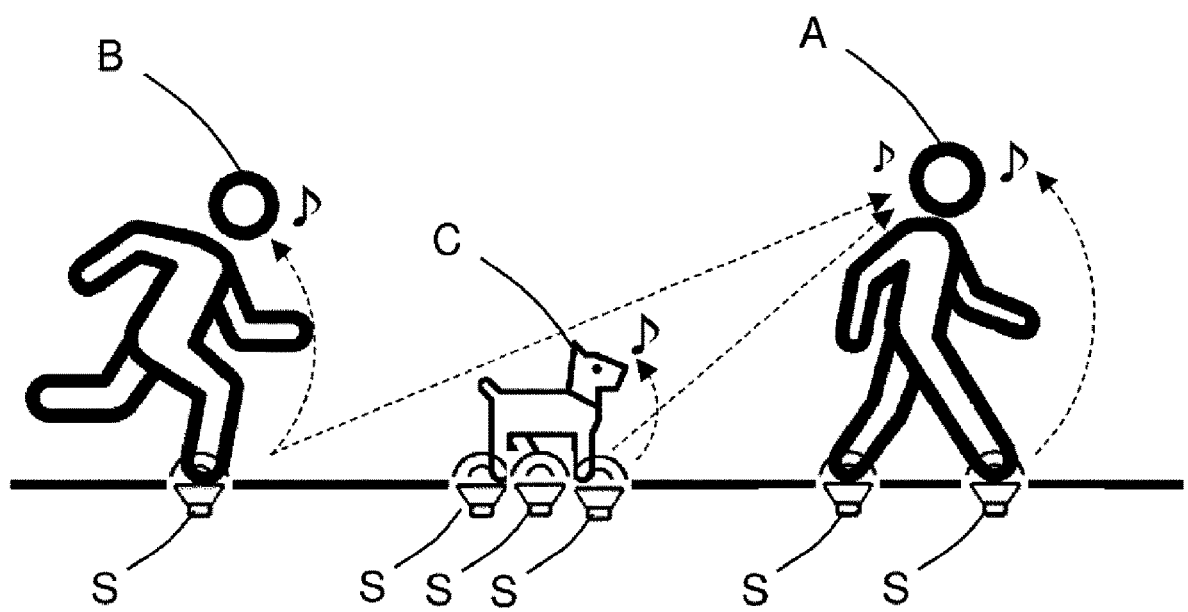
FIG. 5 is an explanatory diagram illustrating another example of installation of the virtual speakers.

FIG. 5 is an explanatory diagram illustrating another example of installation of the virtual speakers. In the example in FIG. 5, the virtual speakers S are respectively installed in the contacting portions of the movement surface with which both feet of the avatar A performing bipedal walking are contacting, a contacting portion of the movement surface with which one foot of an avatar B performing bipedal running is contacting, and contact portions of the movement surface with which feet of an avatar C performing quadrupedal walking are contacting.

Figure 6:
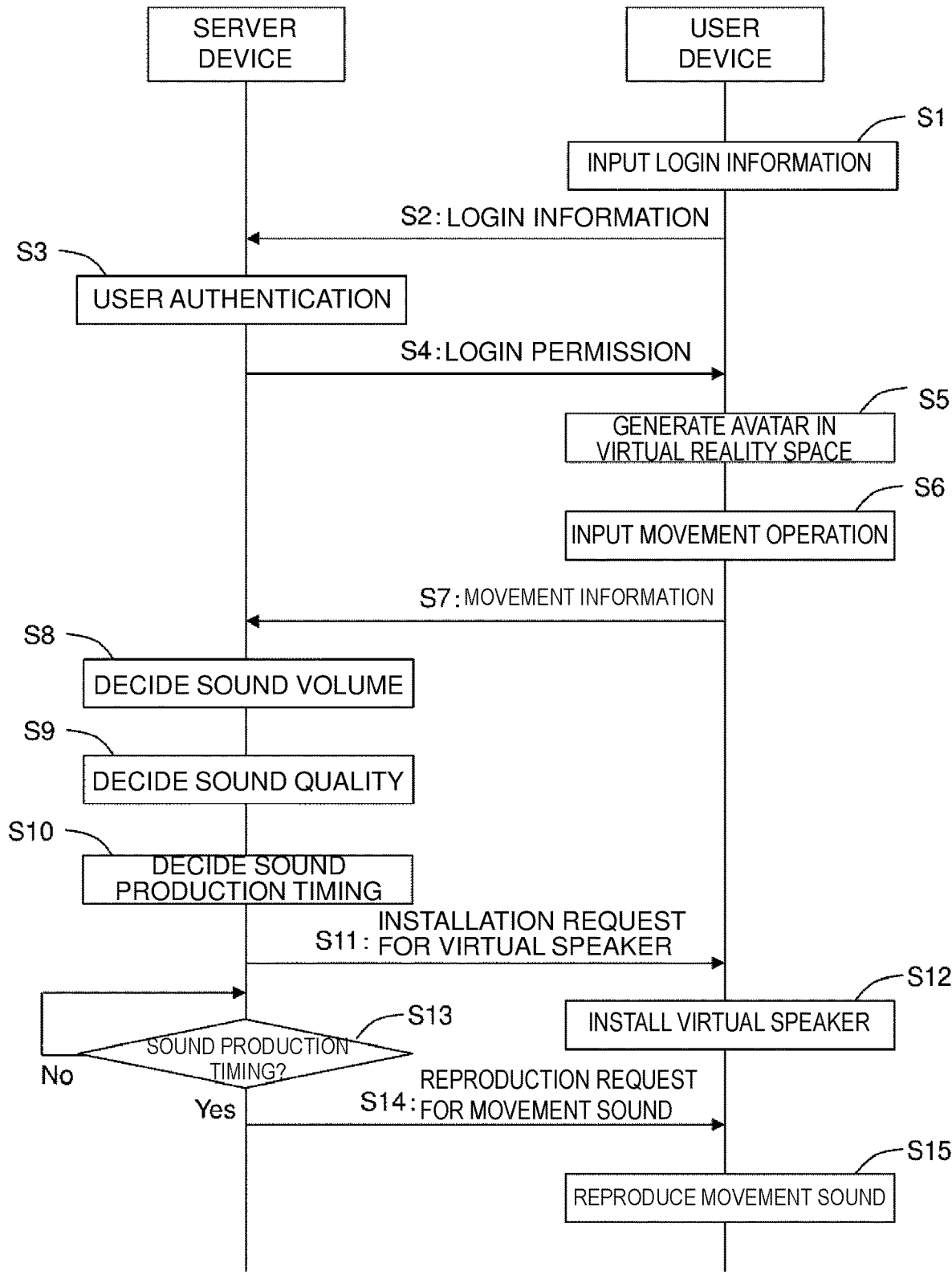
FIG. 6 is a sequence diagram for explaining an action of the movement sound generation system in the embodiment of the present invention.

A description will be made, with reference to a sequence diagram in FIG. 6, about an action of the movement sound generation system 1 which is configured as described above.

In a case where the movement sound generation system 1 of the present embodiment is used, login information is first input by the user device 2 (S1), the input login information is then transmitted from the user device 2 to the server device 3 (S2), and a process of user authentication is performed in the server device 3 (S3). When the user authentication succeeds, login permission is sent from the server device 3 to the user device 2 (S4).

Next, when a user who is given the login permission operates the user device 2, thereby generates an avatar in the virtual reality space (S5), and moves the avatar in the virtual space (S6), the movement information of the avatar is sent from the user device 2 to the server device 3 (S7).

In the server device 3, the sound volume of the movement sound is decided based on the mass of the moving body in the virtual space (S8), and the sound quality of the movement sound is decided based on the material information of the ground contacting portion of the moving body which contacts the movement surface in the virtual space and the material information of the movement surface contacted by the ground contacting portion of the moving body (S9). In addition, based on the timing at which the ground contacting portion of the moving body contacts the movement surface, the sound production timing of the movement sound is decided (S10).

Next, an installation request for the virtual speaker is sent from the server device 3 to the user device 2 (S11), and the virtual speaker which plays the movement sound of the moving body is installed in the contacting portion of the movement surface contacted by the ground contacting portion of the moving body (S12).

Then, at a time point of the sound production timing decided in step S10 (S13), a playing request for the movement sound is sent from the server device 3 to the user device 2 (S14). Thus, the movement sound with the sound volume and the sound quality, which are decided in steps S8 and S9, is played by the virtual speaker which is installed in step S12 (S15).

In the movement sound generation system 1 of the above present embodiment, the movement sound in a case where the moving body (such as an avatar, for example) moves on the predetermined movement surface (such as a ground surface or a floor surface, for example) in the virtual space (such as a VR space, for example) is automatically generated. In this case, the sound volume of the movement sound is decided based on the mass of the moving body, the sound quality of the movement sound is decided based on the material information of the ground contacting portion of the moving body and of the movement surface, and the sound production timing of the movement sound is decided based on the timing at which the ground contacting portion of the moving body contacts the movement surface. Consequently, the movement sounds with reality can be generated for individual moving bodies (including the moving body operated by the user) in the virtual space, and bodily sensation in the user in the virtual space is thereby improved (see FIG. 5).

That is, in the movement sound generation system 1 of the present embodiment, the movement sound with reality can be generated such that analogy and recognition in a real space can also be recreated in the virtual space. In this case, the movement sound which is produced by the moving body itself is generated, and reality can be improved. Further, movement sounds of all of moving bodies are produced, and sound images of sound sources of the other moving bodies can thereby be located and analogized.

Further, in the present embodiment, when the sound quality of the movement sound is decided, the contacting portion of the movement surface to be contacted by the ground contacting portion of the moving body is predicted, and only the material information of the contacting portion of the movement surface is read in advance. Consequently, compared to a case where the material information of the whole movement surface is read, a processing load for generating the movement sound can be reduced.

Further, in the present embodiment, the virtual speaker which plays the movement sound of the moving body is installed in the contacting portion of the movement surface contacted by the ground contacting portion of the moving body. The movement sound of the moving body is played from the virtual speaker which is installed as described above, and the movement sound with reality can thereby be generated.

Further, in the present embodiment, even in a case where the mass of the moving body in the virtual space is not set, the mass of the moving body is estimated based on the volume of the moving body, and the sound volume of the movement sound can thereby appropriately be decided.

Further, in the present embodiment, a determination can appropriately be made about the timing at which the ground contacting portion of the moving body contacts the movement surface based on the timing at which the potential energy of the ground contacting portion of the moving body becomes the minimum, and the sound production timing of the movement sound can thus appropriately be decided.

In the foregoing, an embodiment of the present invention has been described by giving examples. However, the scope of the present invention is not limited thereto but it is possible to make variations and modifications in accordance with purposes within the scope of the claims.

In the foregoing, a description has been made about a preferable embodiment, which is conceivable at the present time, of the present invention; however, it is intended to be understood that various modifications are possible for the present embodiment, and it is intended that the attached claims include all of such modifications within the scope of the true spirit of the present invention.

INDUSTRIAL APPLICABILITY

As described in the foregoing, a movement sound generation system according to the present invention can generate a movement sound with reality, has an effect of enabling bodily sensation in a user in a virtual space to be improved, and is useful as a virtual reality space system or the like.

REFERENCE SIGNS LIST 1 movement sound generation system
2 user device
3 server device
4 head mounted display
5 controller
6 control unit
7 storage unit
8 sound volume decision unit
9 sound quality decision unit
10 sound production timing decision unit
11 movement sound playing unit
N network

The invention claimed is:

1. A movement sound generation system generating a movement sound in a case where a moving body moves on a predetermined movement surface in a virtual space, the movement sound generation system comprising:
   a sound volume decision unit which decides a sound volume of the movement sound based on a mass of the moving body in the virtual space;
   a sound quality decision unit that decides a sound quality of the movement sound based on material information of a ground contacting portion of the moving body which contacts a movement surface in the virtual space, and on material information of the movement surface contacted by the ground contacting portion of the moving body;
   a sound production timing decision unit which decides a sound production timing of the movement sound based on a timing at which the ground contacting portion of the moving body contacts the movement surface; and
   a movement sound playing unit which plays the movement sound of the moving body with a sound volume decided by the sound volume decision unit, with a sound quality decided by the sound quality decision unit, and at a sound production timing decided by the sound production timing decision unit in the virtual space, wherein based on movement information of the moving body, the sound quality decision unit predicts a contacting portion of the movement surface to be contacted by the ground contacting portion of the moving body, and reads in advance only material information of the predicted contacting portion of the movement surface.

2. The movement sound generation system according to claim 1, wherein the movement sound playing unit installs a virtual speaker, which plays the movement sound of the moving body, in a contacting portion of the movement surface contacted by the ground contacting portion of the moving body.

3. The movement sound generation system according to claim 1, wherein in a case where the mass of the moving body in the virtual space is not set, the sound volume decision unit estimates the mass of the moving body based on a volume of the moving body.

4. The movement sound generation system according to claim 1, wherein the sound production timing decision unit makes a determination about the timing at which the ground contacting portion of the moving body contacts the movement surface based on a timing at which potential energy of the ground contacting portion of the moving body becomes a minimum.

5. A method of generating a movement sound in a case where a moving body moves on a predetermined movement surface in a virtual space, the method being executed in a movement sound generation system, the method comprising:

a step of deciding a sound volume of the movement sound based on a mass of the moving body in the virtual space;

a step of deciding a sound quality of the movement sound based on material information of a ground contacting portion of the moving body which contacts a movement surface in the virtual space, and on material information of the movement surface contacted by the ground contacting portion of the moving body;

a step of deciding a sound production timing of the movement sound based on a timing at which the ground contacting portion of the moving body contacts the movement surface; and a step of playing the movement sound of the moving body with a sound volume, with a sound quality, and at a sound production timing, which are decided in the steps, in the virtual space, wherein based on movement information of the moving body, the step of deciding includes predicting a contacting portion of the movement surface to be contacted by the ground contacting portion of the moving body, and reading in advance only material information of the predicted contacting portion of the movement surface.

6. A non-transitory computer-readable medium having embodied therein a program for generating a movement sound in a case where a moving body moves on a predetermined movement surface in a virtual space, the program causing a computer to execute:

a process of deciding a sound volume of the movement sound based on a mass of the moving body in the virtual space;

a process of deciding a sound quality of the movement sound based on material information of a ground contacting portion of the moving body which contacts a movement surface in the virtual space, and on material information of the movement surface contacted by the ground contacting portion of the moving body;

a process of deciding a sound production timing of the movement sound based on a timing at which the ground contacting portion of the moving body contacts the movement surface; and a process of playing the movement sound of the moving body with a sound volume, with a sound quality, and at a sound production timing, which are decided in the processes, in the virtual space, wherein based on movement information of the moving body, the process of deciding includes predicting a contacting portion of the movement surface to be contacted by the ground contacting portion of the moving body, and reading in advance only material information of the predicted contacting portion of the movement surface.

* * * * *